H. SNIDER.
Grain-Meters.

No. 207,688. Patented Sept. 3, 1878.

WITNESSES:
Chas. Nida
C. Sedgwick

INVENTOR:
H. Snider
BY Munn &
ATTORNEYS

UNITED STATES PATENT OFFICE.

HIRAM SNIDER, OF PLATTSVILLE, ONTARIO, CANADA.

IMPROVEMENT IN GRAIN-METERS.

Specification forming part of Letters Patent No. 207,688, dated September 3, 1878; application filed June 18, 1878.

*To all whom it may concern:*

Be it known that I, HIRAM SNIDER, of Plattsville, in the Province of Ontario and Dominion of Canada, have invented a new and Improved Weighing Apparatus for Flour-Mills, of which the following is a specification:

The object of my invention is to construct an automatic weighing apparatus which may be attached to the delivery-spouts of flour-mills for the purpose of weighing the grain, flour, bran, and other products as they are delivered, and registering the weight. By this apparatus the gross product of a quantity of grain when ground may be ascertained, or the weight of the flour, bran, and middlings may be found separately, and a miller can ascertain without trouble the exact yield of a given quantity of grain.

My invention consists of a receiver hung upon the short arm of a scale-beam, which is placed contiguous to the delivery-spout, so that the flour or other article to be weighed may be discharged into the receiver. The receiver discharges its contents automatically at intervals and in quantities proportioned to the position of the weight on the scale-beam. The movement of the scale-beam caused by the weight of the receiver and its contents trips the discharge-gate of the receiver and closes the delivery-spout at the same time, and the discharge is registered by a counter. The closing of the receiver as soon as it is emptied is accomplished by a weight on the discharge gate or door, and the return of the scale-beam to its first position allows the delivery-spout to be opened as soon as a sufficient quantity of flour has accumulated in the spout to overbalance the weighted valve, and the filling of the receiver to the desired amount is resumed.

Figure 1:
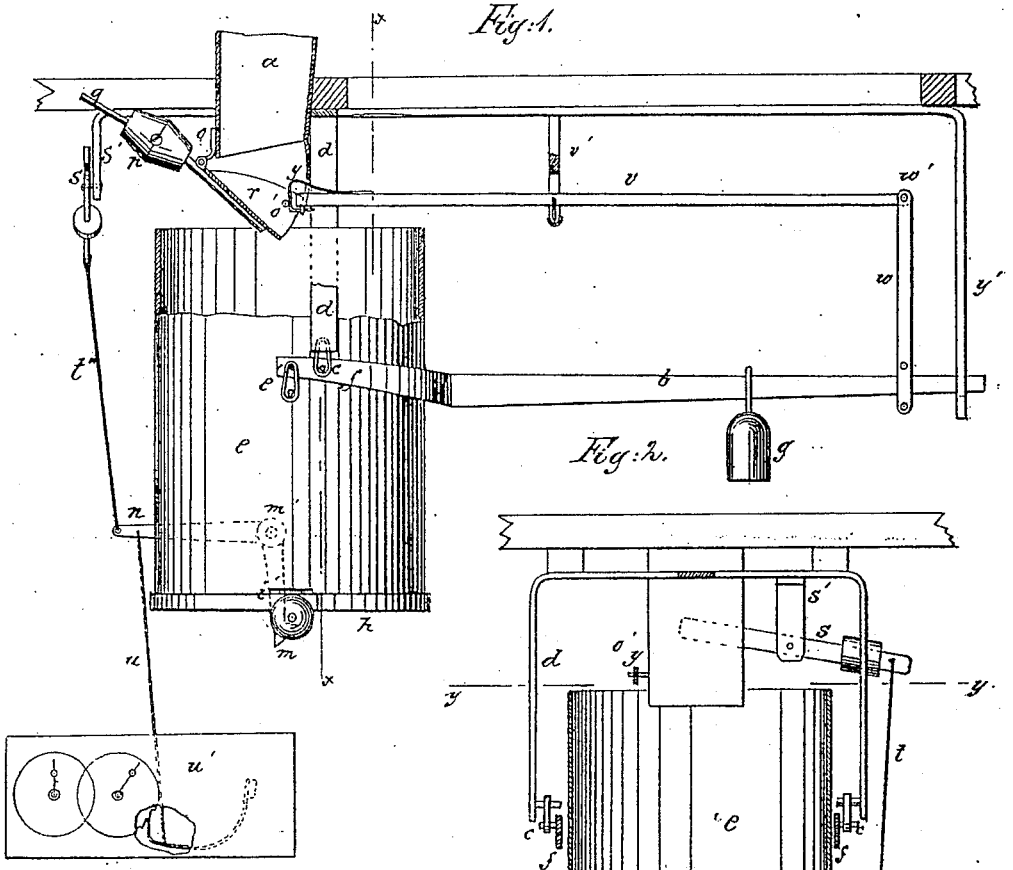
Figure 2:
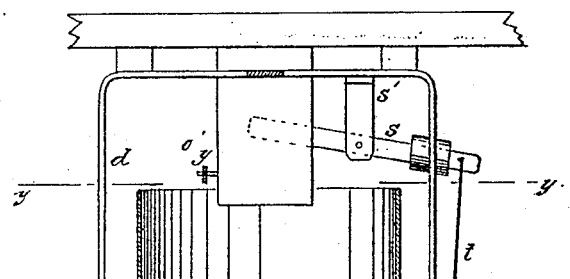
Figure 3:
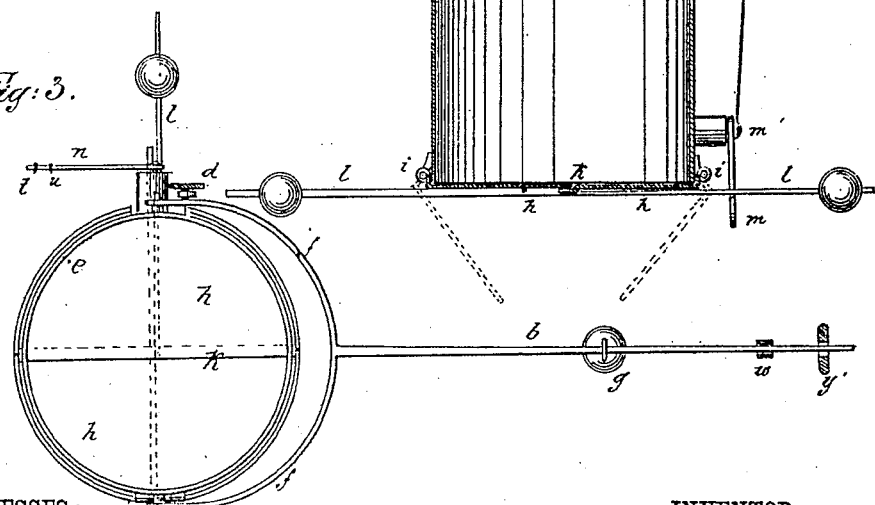

In the drawing, Figure 1 is an elevation, partially in section, of my weighing apparatus, connected with a delivery-spout. Fig. 2 is a vertical section through the receiver; and Fig. 3 is a sectional plan at the line $x$ $x$ of Fig. 2.

Similar letters of reference indicate corresponding parts.

$a$ is the delivery-spout for the flour or other article which is to be weighed. This spout $a$ may be the delivery from the stones, so that the total product from the grain will be weighed; or the apparatus may be attached to the spout which delivers the flour from the bolt, and a similar apparatus may be connected with each of the deliveries, for weighing the flour, middlings, and bran separately.

$b$ is a scale-beam, hung by a knife-edge, $c$, in a loop attached to the hanger $d$, which is suspended near the spout $a$.

$e$ is the receiver, hung in the gimbals $f$ of the scale-beam $b$ by a loop, $e'$, upon a knife-edge at the end of the gimbals $f$, supporting the receiver $e$ by a knife-edge at each side of the receiver. The knife-edge $c$ is the fulcrum of the scale-beam, and the weight at which the long arm of the scale-beam $b$ may be thrown up is regulated by a sliding weight, $g$, on the beam.

The open end of the receiver is under the spout $a$, to allow the flour, &c., to run into it from the spout, and the bottom of the receiver is constructed as a hinged door or gate. I have shown it as made in two pieces, forming two doors, $h$ $h$, hinged at $i$, so that the doors come together at the center, where they lap to form a tight joint, as seen at $k$.

$l$ $l$ are rods attached to the doors $h$ $h$ and projecting beyond the hinges $i$, and having upon them adjustable weights, which serve to keep the doors $h$ $h$ closed. The weights are to be adjusted so that the doors $h$ $h$ will not close until the entire contents of the receiver are discharged.

$m$ is a latch upon a pin, $m'$, at the side of the receiver $e$, which latch serves to hold the doors $h$ closed, and falls automatically under the rod $l$ for that purpose by its own weight, assisted by the weight of its crank-arm $n$.

At the end of the spout $a$ there is hinged at $o$ a valve or gate, $r$, having an adjustable weight, $p$, upon a rod, $q$, which acts to close the valve $r$ and retain the flour until there has accumulated a quantity sufficient to overcome the weight $p$.

$s$ is a lever, pivoted upon a hanger, $s'$, and connected by a rod, $t$, from one end to the crank-arm $n$ of the latch $m$. The lever $s$ is hung in such a position that the end opposite to where the rod $t$ is attached lies in the path of the rod $q$ upon the gate $r$ as the gate $r$ swings.

$u$ is a rod from the crank-arm $n$ of the latch $m$, connected to a registering machine, $u'$, of any desired character.

$v$ is a horizontal lever, fulcrumed near its center in a hanger, $v'$, above the scale-beam $b$, in such a position that one of its ends terminates near the valve $r$, and the other end near the outer end of the scale-beam $b$.

$w$ is a link, attached loosely to the end of the beam $b$, and connected by a pin, $w'$, to the lever $v$, so that the beam $b$ operates the lever $v$. The end of the lever $v$ next to the valve $r$ is provided with a spring-catch, $y$. When the valve $r$ is open a pin, $o'$, upon the valve is in contact with the spring-catch $y$ upon the end of the lever $v$, and prevents the valve $r$ closing. The movement of the scale-beam is limited by a guard, $y'$, at the end of the beam $b$.

The parts described may be suspended from a ceiling, as shown in Fig. 1, or from any other convenient place.

The operation is as follows: The valve $r$, being set open and held by the lever $v$, as described, the flour or other product coming from the spout $a$ runs freely into the receiver $e$, where it accumulates until there is sufficient weight to overcome the weight $g$, set upon the scale-beam $b$, and throw up the outer end of the beam $b$ and lever $v$. This motion depresses the opposite end of the lever $v$ and releases the pin $o'$, and the valve $r$ is immediately closed by its weighted rod $q$. The fall of the rod $q$, in closing the valve $r$, brings it in contact with one end of the lever $s$, depressing the same, and through the medium of the rod $t$ and crank-arm $n$ releases the latch $m$ and permits the doors $h$ $h$ to be opened by the weight of the contents of the receiver. The receiver is thereby rapidly emptied, and the movement of the latch acts by the rod $u$ to cause the register $u'$ to indicate one filling of the receiver.

When the receiver has discharged its contents the scale-beam $b$ returns to its first position. The doors $h$ are closed by the weighted rods $l$ and are caught by the latch $m$. The gate $r$ remains closed until the accumulation in the spout $a$ is sufficient to overcome the weight $p$ and open the valve $r$. When this occurs the pin $o'$ comes into contact with the spring-catch $y$ and depresses the lever $v$ until it clears the lever and allows it to return and hold the valve $r$ by the spring-catch $y$, and the connection of the link $w$ with the beam $b$ allows the lever $v$ to be moved, as just described, without affecting the beam. The valve $r$ is now open, and the receiver may be filled as before.

Every discharge of the receiver $a$ is indicated by the register, and, the weight at which the beam is set being known, the total weight of the flour passing through the receiver is readily ascertained.

The receiver $e$ and other parts of the apparatus may be made of metal or wood, and I do not limit myself in this particular, nor to the shape of the receiver.

Having thus described my invention, I claim as new and desire to secure by Letters Patent—

1. An automatic weighing apparatus for flour-mills adapted for connection with the discharge-spout, and whereby the flour or other product from the spout is automatically weighed and discharged, substantially as set forth.

2. The spout $a$, weighted valve $r$, lever $s$, and rod $t$, in combination with the crank $n$, latch $m$, and hinged doors or gates $h$ $h$ of the receiver $e$, substantially as and for the purpose described.

3. The receiver $e$, having the hinged and weighted doors or gates, in combination with the latch $m$, substantially as and for the purposes set forth.

4. The weighted valve $r$, pin $o'$, lever $v$, spring $y$, and link $w$, in combination with the scale-beam $b$, substantially as and for the purpose described.

5. The receiver $e$, scale-beam $b$, lever $v$, spring $y$, weighted valve $r$, pin $o'$, lever $s$, rod $t$, and crank $n$, in combination with the register or counter $u'$, substantially as and for the purpose described.

HIRAM SNIDER.

Witnesses:
CHAS. LIVINGSTONE,
SAMUEL H. HALLMAN.